United States Patent [19]

Greinke

[11] Patent Number: 4,762,566
[45] Date of Patent: Aug. 9, 1988

[54] HIGH COKING VALUE PITCH BINDERS
[75] Inventor: Ronald A. Greinke, Medina, Ohio
[73] Assignee: Union Carbide Corporation, Danbury, Conn.
[21] Appl. No.: 804,894
[22] Filed: Dec. 5, 1985
[51] Int. Cl.⁴ .............................................. C09D 3/00
[52] U.S. Cl. .................................... 106/284; 106/285
[58] Field of Search ................. 106/284, 285; 264/105
[56] References Cited

U.S. PATENT DOCUMENTS

| | | | |
|---|---|---|---|
| 2,761,848 | 9/1956 | Bushong et al. | 252/510 |
| 3,107,153 | 10/1963 | Boquist | 23/209.4 |
| 3,275,585 | 9/1966 | Baum et al. | 260/28 |
| 3,689,299 | 9/1972 | Brown et al. | 106/284 |
| 3,801,342 | 4/1974 | Berber et al. | 106/284 |
| 3,840,485 | 10/1974 | Brown et al. | 260/28 |
| 3,932,244 | 1/1976 | Mikkelsen | 427/104 |
| 4,133,090 | 1/1979 | Peterson | 106/284 |
| 4,350,800 | 9/1982 | Hesse et al. | 525/480 |
| 4,501,836 | 2/1985 | Nakamura et al. | 524/66 |

FOREIGN PATENT DOCUMENTS 0794041 1/1981 U.S.S.R. .

Primary Examiner—A. Lionel Clingman
Assistant Examiner—Willie J. Thompson
Attorney, Agent, or Firm—James L. Sonntag

[57] ABSTRACT

A binder which comprises pitch and the condensation product of (A) a ketone or dione selected from the group consisting of $C_3$ to $C_{13}$ aliphatic linear, branched or cyclic ketones and diones having at least one active hydrogen on each carbon atom adjacent to a

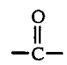

group, compounds of the formula:

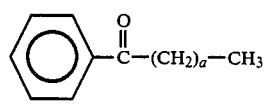

and

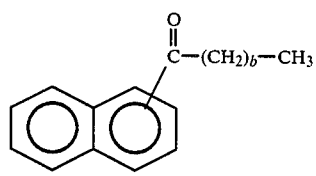

wherein a and b are integers having a values of 0 to 6, and the $C_1$ to $C_4$ alkyl substituted derivatives thereof; and (B) at least one compound selected from the group consisting of $C_5$ to $C_{11}$ aldehydes, said aldehydes having an aromatic ring containing 4 to 6 carbon atoms and 0 to 1 oxygen atoms, wherein said condensation product has a Heat of Reaction Value of less than about 155 cal/g. Said binders being useful in the production of graphite electrodes having superior physical and electrical properties.

19 Claims, No Drawings

HIGH COKING VALUE PITCH BINDERS

This invention relates to high coking value pitch binders and the use of such binders in producing high density carbon and graphite products.

BACKGROUND OF THE INVENTION

Carbon and graphite articles have many and diverse applications including use as electrodes, refractories, dies, electrical brushes, structural components in missiles and aircraft, and moderators and reflectors in nuclear reactors. A common method of article fabrication involves mixing a desired blend of carbon particles with a pitch binder; heating the resultant mixture to a sufficiently high temperature to enable the pitch to fluidize the particles; forming the fluidized mixture into a compact; molding or extruding the compact into a desired shape which then is heated to a sufficiently high temperature to coke the pitch; and, if desired, graphitizing the coked articles. During coking the volatile components of the pitch binder vaporize leaving voids in the processed articles. In high performance applications wherein a dense article is required, prior to graphitization the article may be impregnated with additional pitch and rebaked until a desired density is achieved.

High coking value pitches, e.g. pitches having a Modified Conradson Coking Value in excess of about 65 weight percent, generally increase the density and improve the physical properties of carbon and graphite articles. As used herein, Modified Conradson Coking Values refer to carbon yields determined as per the procedure of ASTM test designation D 2416-84. However, high coking value pitches generally have Mettler Softening Points in excess of about 130° C. and thus require the use of relatively high processing temperatures in the mixing and extruding steps of article manufacture. As used herein, Mettler Softening Point refers to the softening point determined as per the procedure of ASTM test designation D 3104-82. High extrusion temperatures are generally undesirable since articles extruded at higher temperatures have a greater tendency to crack during cooling than articles extruded at lower temperatures.

Various additives have been suggested for reducing the softening point of pitch, for example:

U.S. Pat. No. 2,761,848 discloses a process for the production of carbon articles wherein a plasticizer comprising at least one of the materials selected from the group consisting of furfural and furfuryl alcohol is blended with carbon particles and pitch having a melting point not less than 150° C. wherein, the plasticizer to pitch ratio is between about 1 to 3 and 1 to 4; U.S. Pat. No. 3,107,153 discloses a binder comprising pitch and prepolymerized furfuryl alcohol; U.S. Pat. No. 3,171,816 discloses as binder pitch additives, organic compounds selected from the group consisting of vinyl acetate, styrene, phthalodinitrile, acrylonitrile, azobenzene, propargyl alcohol, indene, acenaphthylene, dicyclopentadiene, turpentine oil, divinyl benzene, 1,6-dimorpholinyl-hexadiyne-2, 4, N-β-chlorallyl-morpholine, methacrylic acid, crotonic acid, vinyl proprionate, dibutyl maleate, 1,4-dicyclohexanonyl-diacetylene, 2-butylidene-cyclohexanone-1, acetyl acetone, succinimide, naphthalene dialdehyde, benzil, anthraquinone, cumarinic acid lactone, 2-allyl-oxyanthraquinone, phenyl isocyanate, cyanoacetic acid, malonic acid dinitrile, benzonitrile, adipic acid nitrile, succinodinitrile and benzalaniline.

Similarly, U.S. Pat. No. 3,689,299 discloses the use of furfural, and cyclohexanone or an aliphatic ketone together with a catalyst as pitch binder additives; U.S. Pat. No. 3,840,485 discloses as pitch additives furfural and a member selected from the group consisting of phenol, cyclohexanone and compounds of the formula:

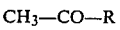

$$CH_3-CO-R$$

wherein R is a hydrocarbon group having between 2 and 4 carbon atoms inclusive; and Russian Pat. No. 794,041 discloses the use of vinyl or carbonyl containing furfurylidene-acetone or difurfurylidene acetone oligomers with binder pitch.

While several of the additives previously listed are effective in providing an initial reduction in binder softening points, some of the additives are extremely reactive at typical particle/binder mixing temperatures, e.g. temperatures up to about 160° C. When maintained at such temperatures for a relatively short time such additives may react with pitch to raise the softening point of the binders and increase the viscosity of particle/pitch compositions, resulting in problems in article extrusion. Additionally, whereas some additives are relatively good plasticizers, e.g. effective additives in reducing the softening point of pitch, the additives may have little or no appreciable coking value. The incorporation of additives with extremely low coking values into pitch produces a binder having a coking value significantly less than that of its pitch component. Further, many additives having relatively high coking values are poor plasticizers, being unable to produce binders wherein pitch softening points are significantly reduced.

Accordingly, it is an object of this invention to provide an additive which contributes to the coking value of a binder, reduces the softening points of high softening point pitches to processable temperatures, remains stable at mixing and processing temperatures in excess of about 160° C. and is safely and easily handled at such temperatures. Further objects will be apparent from the ensuing discussion and the appended claims.

DEFINITIONS

For purposes of describing this invention the following definitions shall apply:

HEAT OF REACTION VALUE—The measure of the change in heat content, measured by means of differential scanning calorimetry (DSC), of a 15 mg additive sample, heated under an argon atmosphere at a rate of 10° C./minute to a maximum temperature of 500° C. at a pressure of 500 psi (34.47 bars). The Heat Of Reaction Value is equivalent to the area under the exothermic peak of the heat of reaction curve generated by the sample, calibrated against the curve generated by a standard with a known heat of fusion. Heat Of Reaction Values are represented in units of calories/gram.

FIRST EXOTHERMIC MAXIMUM—The temperature at which, following reaction initiation, the first peak occurs in the heat of reaction curve generated by a 15 mg sample of additive, heated at a rate of 10° C./minute to a maximum temperature of 500° C., at a pressure of 500 psi (34.47 bars) under an argon atmosphere as measured by DSC.

ONSET TEMPERATURE—The temperature at which a 15 mg sample of additive heated at a rate of 10° C./minutes, at a pressure of 500 psi under an argon atmosphere begins to undergo reaction, as measured by DSC. The onset temperature is determined by extrapolating a line tangent to the inflection point on the upward portion of the heat of reaction curve generated by the sample to the extrapolated baseline of the curve.

BINDER COKING VALUE—The Modified Conradson Coking Value (MCCV) of a binder.

EFFECTIVE ADDITIVE COKING VALUE—A measure of the MCCV of an additive in a pitch-containing binder, defined as:

$$\frac{(100)(MCCV \text{ of binder}) - (\text{percent of pitch in binder})(MCCV \text{ of pitch})}{\text{percent of additive in binder}}$$

PLASTICIZING EFFICIENCY—The average lowering of softening point in ° C. per weight percent of additive in a binder, determined by adding 40 grams of additive to 300 grams of coal tar pitch having a Mettler Softening Point of 165° C. heated to a temperature of 200° C., permitting the resultant mixture to cool to 165° C. while continuously stirring same, continuing mixing at 165° C. for a period of 10 minutes, determining the binder softening point by ASTM test method D3104-82; and calculating therefrom the resultant reduction in softening point per weight percent of additive.

SUMMARY OF THE INVENTION

In one embodiment, this invention is directed to a binder which comprises pitch and the condensation product of a $C_3$ to $C_{13}$, preferably $C_3$ to $C_6$, aliphatic linear, branched or cyclic ketone or dione having at least one active hydrogen on each carbon atom adjacent to a

group and at least one compound selected from the group consisting of $C_5$ to $C_{11}$ aldehydes, said aldehydes having an aromatic ring containing 4 to 6 carbon atoms and 0 to 1 oxygen atoms, wherein the condensation product is further characterized as having a Heat of Reaction Value of less than 155 cal/g, preferably less than about 100 cal/g, and most preferably less than about 70 cal/gram.

In another embodiment, this invention is directed to a binder which comprises pitch and the condensation product of a ketone selected from the group consisting of ketones of the formula:

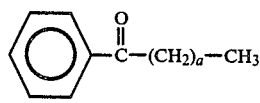

and

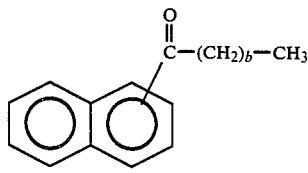

wherein a and b are integers having values of 0 to 6, preferably 0 to 4, and most preferably 0, and the $C_1$ to $C_4$ alkyl substituted derivatives thereof, and at least one $C_5$ to $C_{11}$ aldehyde as previously defined. For purposes of this invention, ketones having the configuration represented by Formula (I) above are termed Formula I ketones, likewise, ketones having the configuration represented by Formula (II) above are termed Formula II ketones. Formula I ketones include compounds such as acetophenone, propyrophenone and butyrophenone. Formula II ketones include compounds such as napthylmethylketone, napthylethylketone and napthylpropylketone. Desirably, the condensation product has a Heat of Reaction Value of less than about 155 cal/g, preferably less than about 100 cal/g and most preferably less than about 70 cal/g.

This invention is further directed to a binder which comprises pitch and the condensation product of (a) a compound selected from the group consisting of $C_3$ to $C_{13}$, aliphatic linear, branched and cyclic ketones and diones having at least one active hydrogen on each carbon atom adjacent to a

group, and ketones of the formula:

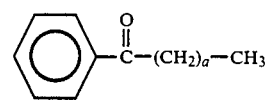

and

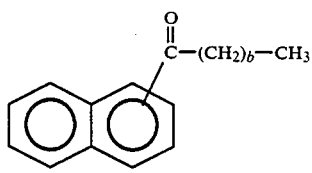

wherein a and b are integers having a value of 0 to 6, and the $C_1$ to $C_4$ alkyl substituted derivatives thereof, preferably ketones or diones selected from the group consisting of acetone, butanone, 3-pentanone, 2,4-pentanedione, 2,5-hexanedione, and acetophenone and the $C_1$ to $C_4$ alkyl substituted derivatives thereof, most preferably being acetophenone or a $C_1$ to $C_4$ alkyl substituted derivatives thereof;

(b) a $C_5$ to $C_6$ aldehyde having an aromatic ring containing 4 to 5 carbon atoms and an oxygen atom, preferably furfural; and (c) at least one compound selected from the group consisting of benzaldehyde and the $C_1$ to $C_4$ alkyl substituted derivatives thereof.

In yet another embodiment, this invention is directed to carbon and graphite articles, particularly electrodes, and carbon-carbon composites produced using the binders herein described.

Further objects of this invention will be apparent from the ensuing discussion and the appended claims.

DETAILED DESCRIPTION OF THE INVENTION $C_3$ to $C_{13}$ aliphatic linear, branched or cyclic ketones or diones having at least one active hydrogen on each carbon atom adjacent to a

group include compounds of the formula:

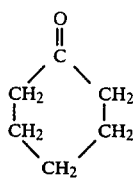
(III)

and the $C_1$ to $C_4$ alkyl substituted derivatives thereof, as well as compounds of the formula:

$$CH_3-(CH_2)_c-\overset{O}{\underset{\|}{C}}-(CH_2)_d-\left(\overset{O}{\underset{\|}{C}}\right)_e-(CH_2)_f-CH_3 \quad (IV)$$

wherein c, d and f are integers independently having values of 0 to 3, preferably 0 to 1, and most preferably 0, and e is an integer having a value of 0 or 1, preferably 0, with the proviso that when e is 1, d may not be zero; and the $C_1$ to $C_4$ alkyl substituted derivatives thereof. Exemplary of the aliphatic ketones and diones are compounds such as acetone, butanone, 3-pentanone, 2,4-pentanedione, 2,5-hexanedione, cyclohexanone and the like, with acetone being particularly preferred.

The aldehydes suitable for use in producing the condensation products of this invention include compounds of the formula:

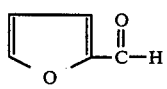
(V)

and

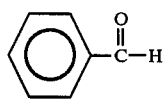
(VI)

and the $C_1$ to $C_4$ alkyl substituted derivatives thereof. Exemplary of these aldehydes are compounds such as furfural, benzaldehyde and methyl benzaldehyde.

For the purposes of this invention, preferred aldols comprise the condensation products of a ketone or dione as previously described, preferably acetone or acetophenone; furfural; and at least one other aldehyde selected from the group consisting of benzaldehyde and the $C_1$ to $C_4$ alkyl substituted derivatives thereof.

The condensation products include aldols of the formula ABA', wherein B is a ketone or dione moiety derived from a $C_3$ to $C_{13}$ aliphatic ketone or dione as previously described and A and A' are independently aldehyde moieties derived from $C_5$ to $C_{11}$ aldehydes having an aromatic ring containing 4 to 6 carbon atoms and 0 to 1 oxygen atoms with the proviso that when A is derived from an aldehyde having an oxygen-containing aromatic ring, A' may not be derived from an aldehyde having an oxygen-containing aromatic ring. ABA' aldols include compounds of the formula:

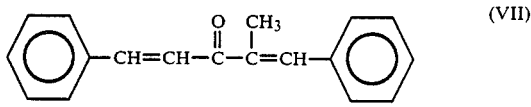
(VII)

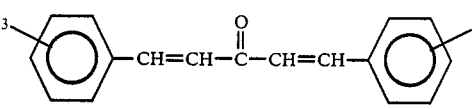
(VIII)

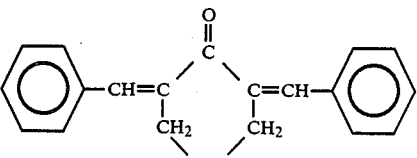
(IX)

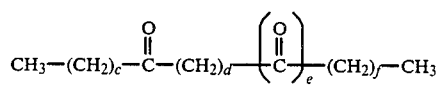
(X)

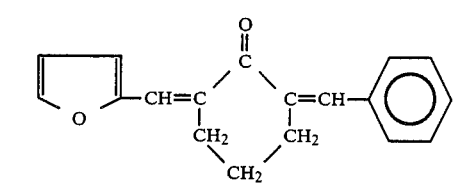
(XI)

(XII)

(XIII)

(XIV)

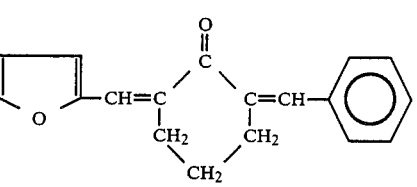
(XV)

and the like. Aldols wherein B is an aliphatic ketone or dione moiety as previously described, preferably, a ketone moiety derived from acetone; A is an aldehyde moiety derived from a $C_5$ to $C_{11}$ aldehyde having an oxygen-containing aromatic ring, preferably furfural; and A' is a moiety derived from benzaldehyde or the $C_1$ to $C_4$ alkyl substituted derivatives thereof are preferred ABA' type aldols. Formula XI and XII aldols are particularly preferred ABA' type aldols.

Condensation products of this invention further include aldols of the Formula AB, A'B and mixtures thereof, wherein B is a ketone or dione moiety derived from a compound selected from the group consisting of $C_3$ to $C_{13}$, aliphatic ketones and diones as previously described and ketones of the formula:

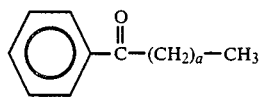

(I)

and

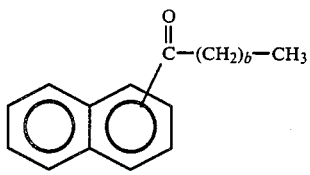

(II)

wherein a and b are integers having values of 0 to 6, preferably 0 to 4 and most preferably 0, and the $C_1$ to $C_4$ alkyl substituted derivatives thereof; A is an aldehyde moiety derived from a $C_5$ to $C_6$ aldehyde having an aromatic ring containing 4 to 5 carbon atoms and an oxygen atom; and A' is an aldehyde moiety derived from benzaldehyde or the $C_1$ to $C_4$ alkyl/substituted derivatives thereof. Condensation products which comprise mixtures of AB and A'B aldols of the formula:

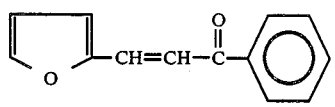

(XVI)

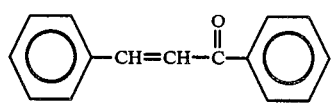

and

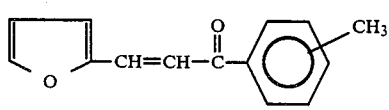

(XVII)

and

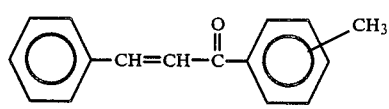

and;

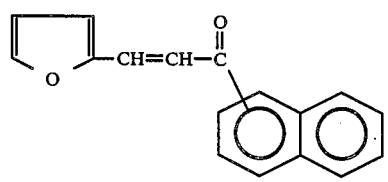

(XVIII)

and

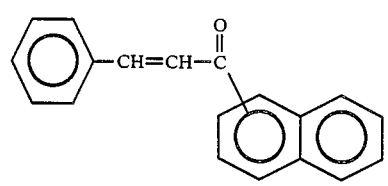

are particularly well suited to the practice of the invention.

The condensation products of this invention may be prepared by conventional acid or base catalyzed aldol syntheses which are well known in the art. It should be noted that when an aliphatic ketone or dione, as previously described, is reacted with one or more aldehydes, as previously described, the reaction product will ordinarily comprise a mixture of aldols in dimer and trimer form. By varying the reaction conditions, the quantities of reactant materials employed and the sequence of component addition, the reaction may be conducted in a relatively controlled manner, such as to optimize formation of the particular condensation product desired.

In the preparation of the aldols of this invention reactant ratios vary according to the ketone or dione reacted. When reacting a $C_3$ to $C_{13}$ aliphatic ketone or dione as previously described, it is desirable to utilize reactants having a ketone or dione to aldehyde mole ratio of from about 1:0.5 to about 1:3, preferably from about 1:1 to about 1:2.5, and most preferably from about 1:1.5 to about 1:2.2, with the proviso that when an aldehyde having an oxygen-containing aromatic ring is a reactant material, the mole ratio of ketone or dione to said oxygen-containing aldehyde ranges from about 1:0.3 to about 1:1.5, preferably from about 1:0.7 to about 1:1.3.

Aldols produced by the reaction of (A) an aliphatic ketone or dione as previously described, preferably acetone; (B) a $C_5$ to $C_6$ aldehyde having an aromatic ring containing 4 to 5 carbon atoms and an oxygen atom, preferably furfural; and (C) benzaldehyde or the $C_1$ to $C_4$ alkyl substituted derivative thereof, wherein the mole ratio of reactants A to B to C ranges from about 1 to 0.3 to 0.3 to about 1 to 1.2 to 1.2 and preferably ranges from about 1 to 0.5 to 0.5 to about 1 to 1.0 to 1.0 are particularly well suited for use herein.

When reacting a Formula I or Formula II ketone as previously described, it is desirable to utilize reactants having a ketone to aldehyde mole ratio of from about 1:0.7 to about 1:1.3, preferably from about 1:0.9 to about 1:1.1, and most preferably from about 1:0.95 to about 1:1.05, with the proviso that when an aldehyde having an oxygen-containing aromatic ring is a reactant material, the mole ratio of ketone to said oxygen containing aldehyde ranges from about 1:0.2 to about 1:1.3, preferably from about 1:0.3 to about 1:0.7.

Aldols produced by the reaction of (A) a Formula I or Formula II ketone, preferably a Formula I ketone, most preferably acetophenone or the $C_1$ to $C_4$ alkyl dirivatives thereof; a $C_5$ to $C_6$ aldehyde having an aromatic ring containing 4 to 5 carbon atoms and an oxygen atom, preferably furfural; and (C) benzaldehyde or the $C_1$ to $C_4$ alkyl substituted derivatives thereof, wherein the mole ratio of reactants A to B to C ranges from about 1 to 0.2 to 0.2 to about 1 to 0.7 to 0.7 and preferably ranges from about 1 to 0.4 to 0.4 to about 1 to 0.6 to 0.6 are particularly well suited for use herein.

Pitches suitable for producing the binders of this invention include coal tar pitch and petroleum pitch. Although pitch selection is largely determined by the properties desired in the carbon products ultimately produced, in the production of high density carbon and graphite articles it is desirable to utilize petroleum pitches having Modified Conradson Coking Values of at least 55%, preferably at least 60%, and coal tar pitches having Modified Conradson Coking Values of at least 65%, preferably at least 70%.

Aldol condensation products having a Heat Of Reaction Value of less than about 155 cal/g, and a First Exothermic Maximum in excess of 300° C., preferably in excess of 310° C., may be easily and conveniently added to pitch in the production of the binders of this invention. The binders of this invention may be prepared by heating pitch to a temperature sufficient to liquify same, typically 170° C. to 210°, adding an aldol condensation product as previously described, allowing the resultant composition to cool to about 150° C. to about 170° C., and maintaining said composition at about 150° C. to about 160° C. for a period of about 15 minutes to about 30 minutes while stirring same. Alternatively, the aldol condensation product may be added to the pitch prior to heating and the resultant composition thereafter heated to temperature sufficient to liguify same. Additives having Onset Temperatures in excess of 180° C., preferably in excess of 250° C. are particularly desirable for use herein since such additives tend to exhibit greater thermal stability when maintained at mixing temperatures of from about 150° C. to about 170° C. for periods in excess of about 1 hour.

Binders typically comprise from about 80 to about 95 percent by weight of pitch, based on the total weight of the pitch and aldol components, of the binder, and from about 5 to about 20 percent by weight of aldol, based on the total weight of the pitch and aldol components of the binder. The preferred weight percents of binder compositions vary depending upon factors such as the coking value of the pitch, the plasticizing efficiency of the aldol condensation product and the softening point of the binder desired. Binder compositions containing sufficient aldol to reduce the Mettler Softening Point of coal tar or petroleum pitch from 165° C. to 120° C., preferably to 110° C. are especially well-suited for use herein.

Desirably, the binders of this invention have Modified Conradson Coking values of at least 62%, preferably at least 64% and most preferably at least 66%. Generally, binders having greater quantities of aldol additive incorporated therein have lower coking values than binders having a lower percentage of aldol. Accordingly, when maximizing binder coking values, it is generally desirable to provide the binder with the minimum amount of aldol that achieves a desired plasticizing effect. The use of aldols having a Plasticizing Efficiency of at least 3° C./percent additive, preferably at least 3.5° C./percent additive and most preferably at least 4° C./percent additive is particularly desirable in the preparation of the binders of this invention.

Binders comprising from about 85 to 88 percent by weight, based upon the total weight of the binder, of coal tar pitch having a Modified Conradson Coking Value of about 71, and from about 12 to 15 percent by weight, based upon the total weight of the binder, of the aldol condensation product of:
(a) acetophenone, a $C_1$ to $C_4$ alkyl substituted derivative thereof, or acetone; and
(b) furfural; and
(c) benzaldehyde or the $C_1$ to $C_4$ alkyl substituted derivatives thereof
have relatively high coking values (typically about 65% to about 68%) and relatively low softening points (typically about 105° C. to about 115° C.).

In one embodiment, the binder of this invention may be blended with a carbonaceous filler, to produce a molding or extrusion compound which may be formed into a desired shape and baked to produce carbonaceous articles. The articles may be subjected to repeated cycles of binder impregnation and baking until a desired density is attained. If desired, the baked articles may be graphitized to produce articles such as electrodes. In addition to having higher densities, graphite electrodes produced using the binder systems of this invention are generally found to have higher flexural strengths and lower electrical resistances than electrodes produced using a pitch of like softening point.

In the production of carbon and graphite electrodes, carbonaceous fillers containing mixtures of various size particles, for example, mixtures of particles ranging in size from about 1/64 inch to about ¼ inch or greater in diameter and particles less than about 1/64 inch in diameter, at least a portion of which may comprise extremely fine particles or "flow", are generally employed. Particle mixtures vary depending upon the intended use of the carbon or graphite articles. Typical molding or extruding compositions contain from about 20 to about 25 weight percent of binder based on the total weight of said composition, and from about 75 to about 80 weight percent of carbonaceous filler, based on the total weight of said composition, wherein the filler comprises from 0 to about 75 weight percent, based on the total weight of filler, of particles having a diameter of at least 0.003 inch and from about 25 to 100 weight percent based on the total weight of filler, of particles having a diameter of less than 0.003 inch.

For purposes of this invention, molding or extrusion compositions wherein graphitized coke comprises up to about 35 weight percent of the particles less than 0.003 inch in diameter are preferred. Molding or extrusion compositions may also contain up to about 2 percent by weight, based on the total weight of said composition, of a puffing inhibitor, including the sulfide forming compounds of iron, sodium, nickel, cobalt and vanadium, and/or up to about 5 percent by weight based on the total weight of said composition, of an extrusion oil, and/or lubricant.

Binders containing from about 5 to about 20 percent by weight, based on the total weight of the binder, of an aldol condensation product as previously described; and from about 80 to about 95 percent by weight, based on the total weight of the binders, of coal tar pitch having a Mettler Softening Point of about 165° C. are found to be particularly useful in the production of carbon and graphite electrodes. When such a binder is mixed with a coke filler and formed and baked in a conventional manner, the resultant composition can produce graphite electrodes which exhibit increases of from about 5 to about 25 percent in flexural strength, increases of from about 0.5 to about 3 percent in density and reductions in electrical resistance of from about 2 to about 15 percent in comparison to graphite electrodes made from a composition comprising a like filler and a binder of like softening point, lacking such a condensation product. It should be noted that the improvements observed in the physical and electrical properties of electrodes produced utilizing the binder herein described may vary depending upon factors such as the particular aldol additive, the quantity thereof present in the binder, the size and shape of the electrode, and the particular coke formulation employed.

Additionally, it is contemplated that the binders of this invention have utility in the production of carbon-carbon composites as described in U.S. Pat. Nos. 4,178,413, 4,131,708 and 3,956,548 incorporated herein by reference. In general, carbon-carbon composites are produced by pressure impregnating a carbon fiber matrix with binder and heating the impregnated matrix under pressure to a sufficiently high temperature to carbonize the binder. It is contemplated that binders comprising an aldol condensation product as previously described and coal tar or petroleum pitches having softening points as high as 200° C. may be employed in the production of such compositions.

The following examples are illustrative of the present invention and are not intended as a limitation upon the scope thereof.

EXAMPLES

Example 1

A mixture of 106 grams of benzaldehyde and 29 grams of acetone was reacted dropwise with a mixture of 100 ml of distilled water and 10 grams of sodium hydroxide which had been chilled to 0° C. Following reaction the resultant mixture was neutralized with a solution of 25 ml of acetic acid in 300 ml of distilled water and allowed to separate into layers. Thereafter the water layer was removed and the product layer washed with distilled water to purify same. The product layer was distilled to 130° C. to remove excess water. By this procedure a product yield of 65 weight percent, based on the weight of the starting reagents, was obtained. Properties of this aldol condensation product, designated DBA are provided in Table I.

Example 2

A mixture of 159 grams of benzaldehyde, 144 grams of furfural and 87 grams of acetone was reacted dropwise with a mixture of 300 ml of distilled water and 50 grams of sodium hydroxide. The reaction was maintained at temperature of 25° C. by means of an ice bath. Following reaction the resultant mixture was neutralized with a solution of 75 ml of acetic acid in 1000 ml of distilled water and allowed to separate into layers. Thereafter the water layer was removed and the product layer washed with distilled water to purify same. The product layer was then distilled to 120° C. to remove excess water. By this procedure, a product yield of 75 weight percent, based on the weight of the starting reagents, was obtained. Properties of this aldol condensation product, designated FBA (1) are provided in Table I.

Example 3

A mixture of 651 grams of furfural, 719 grams of benzaldehyde and 630 grams of acetone was reacted dropwise with a mixture of 900 ml of methanol, 600 ml of distilled water and 153 grams of sodium hydroxide. The reaction was maintained at temperature not in excess of 25° C. by means of an icebath. Following reaction the resultant mixture was neutralized with a solution of 410 ml of acetic acid in 3000 ml of distilled water and allowed to separate into layers. Thereafter the water layer was removed and the product layer washed with distilled water to purify same. The product layer was then distilled to 120° C. to remove excess water. By this procedure, a product yield of 75 weight percent, based on the weight of the starting reagents, was obtained. Properties of this aldol condensation product, designated FBA(2) are provided in Table I.

Example 4

A mixture of 106 grams of benzaldehyde and 49 grams of cyclohexanone was reacted dropwise with a mixture of 10 grams of sodium hydroxide and 100 ml of distilled water which had been chilled to a temperature of 0° C. Following reaction the resultant mixture was neutralized with a solution of 25 ml of acetic acid in 300 ml of distilled water and allowed to separate into layers. Thereafter, the water layer was removed and the product layer washed with distilled water to purify same. The product layer was distilled to 120° C. to remove excess water. By this procedure a product yield of 79 weight percent, based on the weight of the starting reagents, was obtained. Properties of this aldol condensation product designated DBC are provided in Table I.

Example 5

A mixture of 96 grams of furfural and 120 grams of acetophenone was reacted dropwise with a mixture of 83 ml of methanol, 56 ml of distilled water and 14 grams of sodium hydroxide. The reaction was maintained at temperature of 25° C. by means of an icebath. Following reaction the resultant mixture as neutralized with a solution of 35 ml of acetic acid in 500 ml of distilled water and allowed to separate into layers. Thereafter the water layer was removed and the product layer washed with distilled water to purify same. The product layer was then distilled to 120° C. to remove excess water. By this procedure a product yield of 71 weight percent, based on the weight of the starting reagents, was obtained. Properties of this aldol condensation product, designated FAc, are provided in Table I.

Example 6

A mixture of 159 grams of benzaldehyde and 360 grams of acetophenone was added dropwise to a mixture of 259 ml of methanol, 168 ml of distilled water and 42 grams of sodium hydroxide. Following dropwise addition the resultant mixture was stirred for 30 minutes. Thereafter 156 grams of furfural was added dropwise to the mixture, and the mixture stirred for 30 minutes. The resultant mixture was then neutralized with a solution of 105 ml of acetic acid in 1500 ml of distilled water and allowed to separate into layers. Thereafter, the water layer was removed and the product layer washed with distilled water to purify same. The product layer was then distilled at 120° C. to remove excess water. By this procedure a product yield of 90 weight percent, based on the weight of the starting reagents, was obtained. Properties of this aldol condensation product designated FBAc are provided in Table I.

Comparative Example 1 ($C_1$)

A mixture of 96 grams of furfural and 29 grams of acetone was reacted dropwise with a mixture of 10 grams of sodium hydroxide, 60 ml of distilled water and 40 ml of methanol which had been chilled to a temperature of 0° C. Following reaction the resultant mixture was neutralized with a solution of 25 ml of acetic acid in 300 ml of distilled water. Upon neutralization the formation of a mustard colored precipitate was noted. Thereafter, the precipitate was rinsed with distilled water and distilled between 120° and 150° C. to remove excess water. The distillate produced was brown in color. By this procedure a product yield of 80 weight percent, based on the weight of the starting reagents, was obtained. Properties of this aldol condensation product, designated DFA are provided in Table I.

Comparative Example 2 (C₂)

A mixture of 192 grams of furfural and 72 grams of 2-butanone was reacted dropwise with a mixture of 10 grams of sodium hydroxide and 100 ml of distilled water which had been chilled to a temperature of 0° C. Following reaction the resultant mixture was neutralized with a solution of 25 ml of acetic acid in 300 ml of distilled water. Upon neutralization the formation of a light yellow precipitate was noted. Therefore, the precipitate was rinsed with distilled water and distilled at 120° C. to remove excess water. By this procedure a product yield of 68 weight percent, based on the weight of the starting reagents was obtained. Properties of this aldol condensation product, designated DFB are provided in Table I.

Comparative Example 3 (C₃)

A mixture of 96 grams of furfural and 43 grams of 3-pentanone was reacted dropwise with a mixture of 10 grams of sodium hydroxide and 100 ml of distilled water which had been chilled to a temperature of 0° C. Following reaction the resultant mixture was neutralized with a solution of 25 ml of acetic acid in 300 ml of distilled water and allowed to separate into layers. Thereafter the water layer was removed and the product layer washed with distilled water to purify same. The resultant product was distilled at 120° C. to remove excess water. By this procedure a product yield of 48 weight percent, based on the weight of the starting reagents, was obtained. Properties of this aldol condensation product designated DFP, are provided in Table I.

Comparative Example 4 (C₄)

A mixture of 96 grams of furfural and 50 grams of 2,4 pentanedione was reacted dropwise with a mixture of 10 grams of sodium hydroxide and 100 ml of distilled water which had been chilled to temperature of 0° C. Following reaction the resultant mixture was neutralized with a solution of 35 ml of acetic acid in 500 ml of distilled water and allowed to separate into layers. Thereafter, the water layer was removed and the product layer washed with distilled water to purify same. The product was observed to be partially soluble in water. Following washing the product was dried in a hood for a period of about 48 hours. By this procedure a product yield of 20 weight percent, based on the weight of the starting reagents, was obtained. Properties of this aldol condensation product, designated DFPD, are provided in Table I.

Comparative Example 5 (C₅)

A mixture of 100 ml of furfuryl alcohol, 100 ml of distilled water and 0.5 ml of a 96% sulfuric acid were reacted at a temperature of 90° C. to produce polyfurfuryl alcohol. The properties of the polyfurfuryl alcohol, designated PFA, are provided in Table I.

TABLE I

| | Example | Heat of Reaction (cal/gram) | Onset Temperature (°C.) | 1st. Exothermic Maximum (°C.) |
| --- | --- | --- | --- | --- |
| 1 | DBA | 47 | 292 | 350 |
| 2 | FBA (1) | 150 | 198 | 314 |
| 3 | FBA (2) | 145 | 243 | 313 |
| 4 | DBC | 47 | 200 | 314 |
| 5 | FAc | 150 | 302 | 347 |
| 6 | FBAc | 65 | 291 | 344 |
| C₁ | DFA | 257 | 213 | 273 |
| C₂ | DFB | 221 | 272 | 325 |
| C₃ | DFP | 60 | 315 | 363 |
| C₄ | DFPD | 110 | 215 | 285 |
| C₅ | PFA | 95 | 312 | 381 |

Examples 7 to 11 and Comparative Examples C₆ to C₁₀

Various aldol-containing binders were prepared by heating coal tar pitch having a Mettler Softening Point of 165° C. to a temperature of about 210° C. in a mixer blanketed with an inert atmosphere of argon; cooling the pitch to a temperature of about 195° C. and adding a quantity of additive, as specified in Table II, to the cooled pitch while continuing stirring of same. Various properties of binders prepared by this procedure are described in Table II. Effective Additive Coking Values were calculated based upon 165° C. pitch having a Modified Conradson Coking Value of 71%.

The data presented in Tables I and II demonstrates that additives having desirable Heat of Reaction, Onset Temperature and 1st Exothermic Maximum Values oftentimes have relatively low Effective Coking Values (e.g. DFP) or are relatively poor plasticizers (e.g. PFA).

TABLE II

| Example | Binder[1] | Mettler Softening Point (Initial) (°C.) | Binder Coking Value (%) | Effective Coking Value of Additive (%) | Plasticizing Efficiency[2] (°C./percent additive) |
| --- | --- | --- | --- | --- | --- |
| 7 | 13% DBA 87% 165° C. pitch | 110 | 67 | 34 | 4.2 |
| 8 | 15% DBA 85% 165° C. pitch | 100 | 64 | 21 | 4.3 |
| 9 | 15% FBA (1) 85% 165° C. pitch | 115 | 67 | 37 | 3.3 |
| 10 | 13% FBA (2) 87% 165° C. pitch | 120 | 67 | 42 | 3.4 |
| 11 | 12% FBAc 88% 165° C. pitch | 113 | 67 | 37 | 4.3 |
| C₆ | 15% DFA 85% 165° C. pitch | 112 | 69 | 53 | 3.5 |
| C₇ | 15% DFB 85% 165° C. pitch | 104 | 65.7 | 30 | 4.1 |
| C₈ | 15% DFP 85% 165° C. pitch | 105 | 62.0 | 5 | 4.0 |
| C₉ | 15% DFPD 85% 165° C. pitch | 115 | 69.1 | 53 | 3.3 |
| C₁₀ | 15% PFA[3] | — | — | — | — |

TABLE II-continued

| Example | Binder[1] | Mettler Softening Point (Initial) (°C.) | Binder Coking Value (%) | Effective Coking Value of Additive (%) | Plasticizing Efficiency[2] (°C./percent additive) |
|---|---|---|---|---|---|
| | 85% 165° C. pitch | | | | |

[1]Additive and pitch percentages are based on the combined weight of the additive and pitch components of the binder.
[2]Plasticizing Efficiencies provided are calculated by adding to 300 grams of coal tar pitch having a Mettler Softening Point of 165° C. sufficient additive to produce a binder having the composition described for a given example, and thereafter proceeding in the manner previously described herein to determine Plasticizing Efficiency.
[3]At this additive level polyfurfuryl alcohol did not plasticize 165° C. pitch.

EXAMPLES 12 to 15

Graphite electrodes were prepared by mixing thirty parts by weight of binder, as specified in Table III, with 100 parts by weight of petroleum coke particles having the formulation described in Table IV, in a Sigma Blade mixer, at a maximum temperature of about 160° C. for a period of about 70 minutes. Thereafter the mix was removed from the mixer and extruded into rods 2.5 inches (6.4 cm) in diameter. The extruded rods were cut into 1 foot lengths, and 3 rods from each electrode mix were thereafter packed in coke particles and heated to 900° C. over a 14 day period. Following heating the packed rods were cooled to room temperature and thereafter graphitized to 2950° C. over an 8-hour period in an induction furnace. From each of the 3 graphitized rods for each electrode mix were cut 8 with-grain billets $\frac{3}{8}$ inch (0.93 cm)×$\frac{3}{8}$ inch (0.95 cm)×2$\frac{1}{4}$ inch (5.7 cm). The density, resistivity and flexural strengths for each of the 24 with-grain billets were measured. Values reported represent an average of the 24 with-grain measurements. Density, resistivity, and flexural strength values were obtained using ASTM test procedures C-559, C-611, and C-651 respectively. Binder coking yields were determined by subtracting the weight of an electrode following heating to 900° C. from the weight of the electrode prior to heating; subtracting from this difference a correction factor corresponding to the weight of extrusion aid present in the binder to obtain the net volatile weight; dividing the net volatile weight by the total weight of pitch and aldol present in the binder component of the electrode and subtracting this value from 100. Reported binder coking yields represent an average of the values obtained for each series of 3 rods. It should be noted that each of the examples is compared to a control prepared at the same time as the individual example involved using a binder comprising coal tar pitch having a Mettler Softening Point of 110° C.

TABLE III

| Example | Binder[1] | Binder Coke Yield (%) | % Increase In Coke Yield As Compared To Control | Density (mg/m³) | % Increase In Density As Compared To Control | Specific Resistance (μohm meter) | % Decrease In Specific Resistance As Compared To Control | Flexural Strength (psi) | % Increase In Flexural Strength As Compared To Control |
|---|---|---|---|---|---|---|---|---|---|
| 12 | Control 110° C. pitch | 68.0 | — | 1.59 | — | 9.41 | — | 1671 | — |
| | 12% FBA (1) 88% 165° C. pitch | 77.9 | 14.6 | 1.63 | 2.5 | 8.47 | 10.0 | 1978 | 18.4 |
| 13 | Control 110° C. pitch | 65.2 | — | 1.60 | — | 8.07 | — | 1482 | — |
| | 12% FBA (1) 88% 165° C. pitch | 78.6 | 20.6 | 1.64 | 2.5 | 7.25 | 10.2 | 1983 | 33.8 |
| 14 | Control 110° C. pitch | 63.7 | — | 1.59 | — | 7.64 | — | 1623 | — |
| | 13.5% FBA (2) 86.5% 165° C. pitch | 76.9 | 20.7 | 1.62 | 1.9 | 7.61 | 0.4 | 1917 | 18.1 |
| 15 | Control 110° C. pitch | 68.5 | — | 1.59 | — | 9.41 | — | 1671 | — |
| | 11% DBA 89% 165° C. pitch | 75.1–76.5 | 9.6–11.7 | 1.60–1.62 | 0.6–1.9 | 8.80–8.88 | 5.6–6.5 | 1877–1907 | 12.3–14.1 |

[1]Aldol and pitch percentages are based on the combined weight of the aldol and pitch components of the binder. Each binder further comprises 6.6 weight percent, based on the total weight of the binder, of a puffing inhibitor and 5.2 weight percent, based on the total weight of the binder, of extrusion aid.

TABLE IV

| Particle Size[1] | % of Coke Formulation |
|---|---|
| 55% thru 200 mesh (flour) | 30.0 |
| 55% thru 200 mesh, (graphitized flour)[2] | 15.0 |
| 20/35 | 18.3 |
| 10/20 | 36.7 |

[1]Particle sizes have the following meanings: 55% thru 200 mesh particles are particles having a diameter such that 55% of same pass through a Tyler 200 size mesh with less than 3% of said particles having a diameter larger than a particle size which would pass through a Tyler 65 size mesh; 20/35 size particles represent a standard distribution of particles which pass through a Tyler 20 size mesh and are held on a Tyler 35 size mesh; and 10/20 size particles represent a standard distribution of particles which pass through a Tyler 10 size mesh and are held on a Tyler 20 size mesh.
[2]Graphitized flour represents particles derived from graphite electrode scrap wherein said scrap is derived from electrodes prepared using a petroleum coke filler.

What is claimed is:
1. A binder chemically stable and non-reactive at mixing and processing temperatures less than about 170° C. which comprises a mixture of 80–95% by weight of pitch and 5–20% by weight of an aldol condensation product of:
(A) a compound selected from the group consisting of $C_3$ to $C_{13}$ aliphatic linear, branched and cycloaliphatic ketones having one carbonyl group and diones having at least one active hydrogen on each carbon atom adjacent to a

group, and aromatic ketones of the formula:

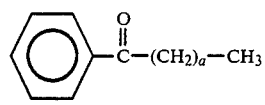

and

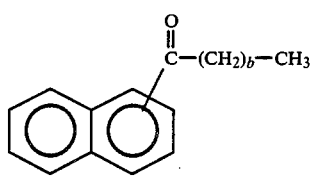

wherein a and b are integers having a value of 0 to 6, and the $C_1$ to $C_4$ alkyl substituted derivatives thereof; and (B) at least one compound selected from the group consisting of $C_5$ to $C_{11}$ aldehydes, said aldehydes having an aromatic ring containing 4 to 6 carbon atoms and 0 to 1 oxygen atoms;

wherein the condensation product is further characterized as having a Heat Of Reaction Value of less than about 155 cal/g.

2. A binder chemically stable and non-reactive at mixing and processing temperatures less than about 170° C. which comprises 80–95% by weight pitch and 5–20% by weight of the condensation product of (A) a ketone having one carbonyl group or dione selected from the group consisting of compounds of the formula:

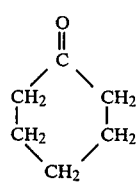

and the $C_1$ to $C_4$ alkyl substituted derivatives thereof, compounds of the formula:

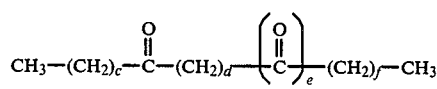

wherein c, d and f are integers independently having values of 0 to 3 and e is an integer having a value of 0 or 1, with the proviso that when e is 1, d may not be zero, and the $C_1$ to $C_4$ alkyl substituted derivatives thereof, and ketones of the formula:

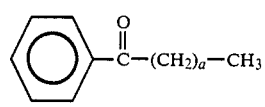

and

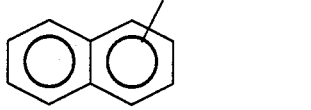

wherein a and b are integers having a value of 0 to 6, and the $C_1$ to $C_4$ alkyl substituted derivatives thereof; (B) a $C_5$ to $C_6$ aldehyde having an aromatic ring containing 4 to 5 carbon atoms and an oxygen atom; and (C) at least one compound selected from the group consisting of benzaldehyde and $C_1$ to $C_4$ alkyl substituted derivatives thereof.

3. The binder of claim 2 wherein component A is selected from the group consisting of acetone, butanone, 3-pentanone, 2,4-pentanedione 2,5-hexanedione, cyclohexanone, acetophenone and the $C_1$ to $C_4$ alkyl substituted derivatives thereof.

4. The binder of claim 2 wherein component A is selected from the group consisting of ketones of the formula:

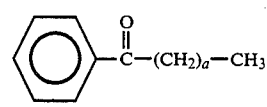

and

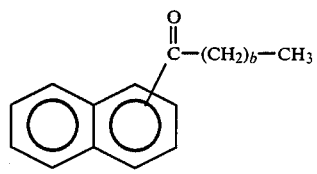

wherein a and b are integers having a value of 0 to 6, and the $C_1$ to $C_4$ alkyl substituted derivatives thereof; furfural; and benzaldehyde or the $C_1$ to $C_4$ alkyl substituted derivatives thereof.

5. The binder of claim 4 wherein said condensation product is further characterized as having a Heat of Reaction Value of less than about 155 cal/g and a First Exothermic Maximum of at least 300° C.

6. The binder of claims 1 or 2 wherein said binder is further characterized as having a Modified Conradson Coking Value of at least 65%.

7. The binder of claim 1 wherein component (A) is a ketone selected from the group consisting of ketones of the formula:

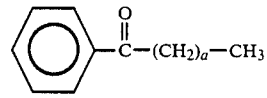

and

-continued

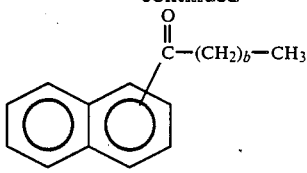

wherein a and b are integers having a value of 0 to 6 and the C₁ to C₄ alkyl substituted derivatives thereof; and wherein the mole ratio of component (A) to component (B) reacted to produce said condensation product ranges from about 1:0.7 to about 1:1.3.

8. The binder of claim 4 wherein the mole ratio of components reacted to produce said condensation product given as the ratio, A:B:C, ranges from about 1:0.2:0.2 to about 1:0.7:0.7.

9. A binder chemically stable and non-reactive at mixing and processing temperatures less than about 170° C. which comprises 80–95% by weight pitch and 5–20% by weight of an aldol condensation product, wherein said aldol condensation product comprises an aldol of the formula ABA' wherein B is a ketone having one carbonyl group or dione moiety derived from a C₃ to C₁₃ aliphatic linear, branched or cyclic cycloaromatic ketone or dione having at least one active hydrogen on each carbon atom adjacent to at

group, and A and A' are independently aldehyde moieties derived from C₅ to C₁₁ aldehydes having an aromatic ring containing 4 to 6 carbon atoms and 0 to 1 oxygen atoms, with the proviso that when A is derived form an aldehyde having an oxygen-containing aromatic ring, A' may not be derived from an aldehyde having an oxygen-containing aromatic ring.

10. The binder of claim 9 wherein the aldol condensation product further comprises aldols of the formula AB and/or A'B wherein A, A' and B are as previously defined in claim 10.

11. A binder chemically stable and non-reactive at mixing and processing temperatures less than about 170° C. which comprises 80–95% by weight pitch and 5–20% by weight of an aldol condensation product wherein said aldol condensation product comprises a mixture of aldols of the Formula A-B and A'B wherein B is a ketone moiety derived from ketones selected from the group of ketones of the formula:

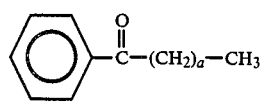

and

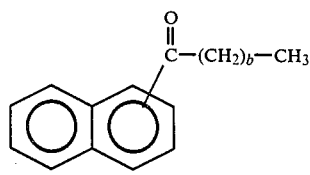

wherein a and b are integers having a value of 0 to 6 and the C₁ to C₄ alkyl substituted derivatives thereof; A is an aldehyde moiety derived from furfural; and A' is an aldehyde moiety derived from benzaldehyde or the C₁ to C₄ alkyl derivatives thereof.

12. The binder of claims 1 or 2 wherein, based on the total weight of the binder, said binder comprises from about 80 to about 95 weight percent of coal tar pitch having a Mettler Softening Point of at least 165° C. and from about 5 to about 20 weight percent of said condensation product.

13. A molding or extrusion composition which comprises, based on the total weight of said composition, from about 21 to about 25 weight percent of a binder as defined in claim 2 and from about 75 to about 79 weight percent of carbonaceous filler.

14. A molding or extrusion composition as defined in claim 13 wherein said carbonaceous filler comprises, based on the total weight of said filler, from 0 to about 75 weight percent of particles having a diameter of at least 0.003 inch and from about 25 to 100 weight percent of particles having a diameter of less than about 0.003 inch.

15. A graphite electrode formed from the molding or extrusion composition of claim 14.

16. A carbon-carbon composite produced using the binder of claims 1 or 2.

17. A process for preparing a binder chemically stable and non-reactive at mixing and processing temperatures less than about 170° C. which comprises reacting (A) a compound selected from the group consisting of C₃ to C₁₃ aliphatic linear, branched and cyclic ketones having one carbonyl group and diones having at least one active hydrogen on each carbon atom adjacent to at

group, and ketones of the formula:

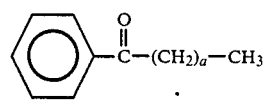

and

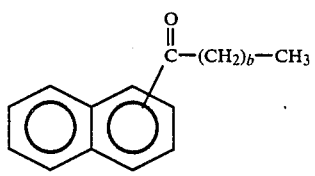

wherein a and b are integers having a value of 0 to 6, and the C₁ to C₄ alkyl substituted derivatives thereof; and (B) at least one compound selected from the group consisting of C₅ to C₁₁ aldehydes, said aldehydes having an aromatic ring containing 4 to 6 carbon atoms and 0 to 1 oxygen atoms; thereby forming a condensation product, said condensation product being characterized by having a Heat Of Reaction Value of less than about 155 cal/g; and then blending the so-formed condensation product with a liquified pitch in amounts such that the binder comprises from about 80 to about 95 percent by weight pitch and from about 5 to about 20 percent by weight of the condensation product.

18. A binder chemically stable and non-reactive at mixing and processing temperatures less than about 170° C. which comprises 80 to 95 weight percent pitch and 5 to 20 weight percent of the condensation product of (A) a ketone having one carbonyl group or dione selected from the group consisting of compounds of the formula:

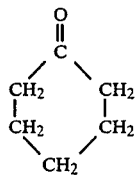 (III)

and the $C_1$ to $C_4$ alkyl substituted derivatives thereof, compounds of the formula:

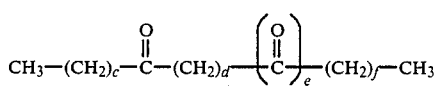 (IV)

wherin c, d and f are integers independently having values of 0 to 3 and e is an integer having a value of 0 or 1, with the proviso that when e is 1, d may not be zero, and the $C_1$ to $C_4$ alkyl substituted derivatives thereof, and ketones of the formula:

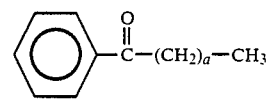 (I)

and

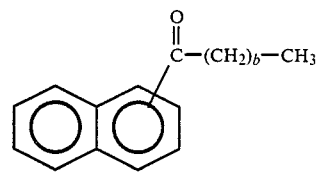 (II)

wherein a and b are integers having a value of 0 to 6, and the $C_1$ to $C_4$ alkyl substituted derivatives thereof; (B) a $C_5$ to $C_6$ aldehyde having an aromatic ring containing 4 to 5 carbon atoms and an oxygen atom; and (C) at least one compound selected from the group consisting of benzaldehyde and $C_1$ to $C_4$ alkyl substituted derivatives thereof, thereby forming a condensation product; and then blending the so-formed condensation product with a pitch at an elevated temperature sufficient to liquify the pitch in amounts such that the binder comprises from about 80 to about 95 weight percent pitch and from about 5 to about 20 weight percent of the condensation product.

19. The process of claim 18 wherein the components A, B and C are reacted in the presence of a catalyst and wherein the condensation product is purified by washing in an aqueous solution.

* * * * *

UNITED STATES PATENT AND TRADEMARK OFFICE
CERTIFICATE OF CORRECTION

PATENT NO. : 4,762,566
DATED     : August 9, 1988
INVENTOR(S) : R.A. Greinke

It is certified that error appears in the above-identified patent and that said Letters Patent is hereby corrected as shown below:

Column 19, claim 9, line 27 - "at" should read ---a---

Column 20, claim 17, line 33 - "at" should read ---a---

Signed and Sealed this

Fifth Day of September, 1989

Attest:

DONALD J. QUIGG

*Attesting Officer*                  *Commissioner of Patents and Trademarks*